(12) United States Patent
Toas et al.

(10) Patent No.: US 8,820,028 B2
(45) Date of Patent: Sep. 2, 2014

(54) ATTIC AND WALL INSULATION WITH DESICCANT

(75) Inventors: Murray S. Toas, Norristown, PA (US); Sam Yuan, Lansdale, PA (US)

(73) Assignee: Certainteed Corporation, Valley Forge, PA (US)

( * ) Notice: Subject to any disclaimer, the term of this patent is extended or adjusted under 35 U.S.C. 154(b) by 332 days.

(21) Appl. No.: 12/603,937

(22) Filed: Oct. 22, 2009

(65) Prior Publication Data

US 2010/0107550 A1    May 6, 2010

Related U.S. Application Data

(63) Continuation-in-part of application No. 11/694,220, filed on Mar. 30, 2007, now abandoned.

(51) Int. Cl.
*E04B 1/62*    (2006.01)
*B32B 5/16*    (2006.01)

(52) U.S. Cl.
USPC ........... 52/742.12; 52/1; 52/407.3; 52/408; 52/742.13; 442/325; 442/417; 62/94; 261/152

(58) Field of Classification Search
USPC .......... 95/117, 122, 123, 125, 148; 96/108; 52/1, 407.1, 407.3, 408, 742.1, 742.12, 52/742.13, 745.05, 745.06; 34/80, 81; 442/320–326, 393, 417; 428/311.11–312.6, 36.4, 36.5, 292.1; 62/94; 261/104, 152

See application file for complete search history.

(56) References Cited

U.S. PATENT DOCUMENTS

| | | | |
|---|---|---|---|
| 1,728,837 A | | 9/1929 | Slayter |
| 2,041,696 A | * | 5/1936 | Codwise ............ 442/322 |
| 2,138,690 A | * | 11/1938 | Altenkirch ............ 62/79 |
| 2,887,426 A | | 5/1959 | Knold |
| 3,167,159 A | * | 1/1965 | Bovenkerk ............ 52/404.1 |
| 3,169,927 A | * | 2/1965 | Matsch ............ 252/62 |
| 3,627,566 A | * | 12/1971 | Stichter et al. ............ 428/95 |

(Continued)

FOREIGN PATENT DOCUMENTS

| | | | |
|---|---|---|---|
| CA | 2367966 A1 | 10/2000 | |
| DE | 4219728 A1 | * 11/1992 | ............ B32B 7/02 |

(Continued)

OTHER PUBLICATIONS

Givoni, Baruch. Passive and Low Energy Cooling of Buildings. John Wiley & Sons: Hoboken, NJ, 1994 (p. 121).*

(Continued)

*Primary Examiner* — Robert Canfield
*Assistant Examiner* — Charissa Ahmad
(74) *Attorney, Agent, or Firm* — Alexander H. Plache; Abel Law Group, LLP

(57) ABSTRACT

A method of reducing the amount of cooling energy required to heat and cool a building is provided. The method includes disposing a porous insulating material in the exterior walls and substantially covering the ceiling in the attic space of the building to a substantial depth. The porous insulating material includes a desiccant. The method further includes permitting the desiccant—bearing porous insulating material to adsorb water moisture from the attic space and then permitting the adsorbed water moisture to desorb from the desiccant—bearing porous insulating material into the enclosed room of the building, resulting in a reduction in the amount of energy required to heat and cool the building.

29 Claims, 6 Drawing Sheets

(56) References Cited

U.S. PATENT DOCUMENTS

| | | | |
|---|---|---|---|
| 4,057,071 A | 11/1977 | Rhodes | |
| 4,074,480 A | 2/1978 | Burton | |
| 4,101,700 A | 7/1978 | Ray, Jr. et al. | |
| 4,138,850 A | 2/1979 | Tchernev | |
| 4,182,681 A | 1/1980 | Gumbert | |
| 4,189,878 A | 2/1980 | Fitzgerald | |
| 4,214,510 A | 7/1980 | Ward | |
| 4,221,096 A * | 9/1980 | Viertlboeck | 52/553 |
| 4,284,674 A | 8/1981 | Sheptak | |
| 4,286,210 A | 8/1981 | Ignatjev | |
| 4,289,980 A | 9/1981 | McLaughlin | |
| 4,432,956 A | 2/1984 | Zarzycki et al. | |
| 4,442,242 A | 4/1984 | Fogelberg | |
| 4,482,010 A | 11/1984 | Cordon | |
| 4,555,447 A | 11/1985 | Sieloff et al. | |
| 4,564,547 A | 1/1986 | Hughes | |
| 4,572,864 A | 2/1986 | Benson et al. | |
| 4,645,519 A * | 2/1987 | Fraioli et al. | 96/146 |
| 4,776,262 A | 10/1988 | Curran | |
| 4,786,301 A | 11/1988 | Rhodes | |
| 4,846,293 A * | 7/1989 | Li | 177/210 C |
| 4,847,148 A | 7/1989 | Schirmer | |
| 4,870,535 A | 9/1989 | Matsumoto | |
| 4,882,485 A | 11/1989 | Duryea | |
| 4,913,942 A * | 4/1990 | Jick | 96/121 |
| 4,924,645 A * | 5/1990 | Abeln | 52/177 |
| 4,930,285 A * | 6/1990 | Ward | 52/742.12 |
| 4,948,766 A * | 8/1990 | Talmy et al. | 501/128 |
| 5,126,401 A | 6/1992 | Chou | |
| 5,222,375 A | 6/1993 | Conrad et al. | |
| 5,236,754 A | 8/1993 | McBride et al. | |
| 5,351,415 A | 10/1994 | Brooks et al. | |
| 5,385,678 A | 1/1995 | Witt | |
| 5,397,631 A | 3/1995 | Green et al. | |
| 5,418,068 A | 5/1995 | Caluori et al. | |
| 5,418,257 A | 5/1995 | Weisman | |
| 5,466,504 A | 11/1995 | Gavin et al. | |
| 5,508,072 A * | 4/1996 | Andersen et al. | 428/34.5 |
| 5,527,570 A * | 6/1996 | Addeo et al. | 428/35.7 |
| 5,535,945 A | 7/1996 | Sferrazza | |
| 5,539,598 A | 7/1996 | Denison | |
| 5,554,238 A | 9/1996 | English | |
| 5,650,030 A | 7/1997 | Kyricos | |
| 5,683,772 A * | 11/1997 | Andersen et al. | 428/36.4 |
| 5,683,810 A | 11/1997 | Babbitt et al. | |
| 5,761,864 A * | 6/1998 | Nonoshita | 52/302.3 |
| 5,770,295 A | 6/1998 | Alderman | |
| 5,837,064 A | 11/1998 | Bowers | |
| 5,875,835 A * | 3/1999 | Shramo et al. | 165/96 |
| 5,877,257 A | 3/1999 | Fetell | |
| 5,885,475 A * | 3/1999 | Salyer | 252/70 |
| 5,890,372 A | 4/1999 | Belding et al. | |
| 5,898,559 A | 4/1999 | Smith | |
| 5,947,646 A * | 9/1999 | Lytle | 406/48 |
| 5,949,635 A | 9/1999 | Botez | |
| 5,972,254 A * | 10/1999 | Sander | 264/39 |
| 5,987,833 A * | 11/1999 | Heffelfinger et al. | 52/406.2 |
| 6,003,327 A | 12/1999 | Belding et al. | |
| 6,012,263 A | 1/2000 | Church et al. | |
| 6,092,375 A | 7/2000 | Denniston | |
| 6,105,335 A | 8/2000 | Vohra | |
| 6,122,477 A | 9/2000 | Parker | |
| 6,150,945 A | 11/2000 | Wilson | |
| 6,155,020 A | 12/2000 | Deem | |
| 6,199,388 B1 * | 3/2001 | Fischer, Jr. | 62/90 |
| 6,262,164 B1 | 7/2001 | Church et al. | |
| 6,329,052 B1 | 12/2001 | Groh et al. | |
| 6,355,333 B1 | 3/2002 | Waggoner et al. | |
| 6,419,171 B1 | 7/2002 | Takayanagi | |
| 6,503,026 B1 | 1/2003 | Mitchell | |
| 6,507,473 B2 | 1/2003 | Richie et al. | |
| 6,638,984 B2 | 10/2003 | Soane et al. | |
| 6,645,598 B2 * | 11/2003 | Alderman | 428/69 |
| 6,793,713 B2 | 9/2004 | Kretsinger et al. | |
| 6,808,772 B2 | 10/2004 | Kunzel et al. | |
| 6,858,068 B2 * | 2/2005 | Smith et al. | 96/127 |
| 6,864,297 B2 | 3/2005 | Nutt et al. | |
| 6,878,455 B2 * | 4/2005 | Kunzel et al. | 428/536 |
| 6,890,666 B2 * | 5/2005 | Kunzel et al. | 428/536 |
| 6,902,611 B2 | 6/2005 | Muris-Trevino | |
| 6,938,386 B2 | 9/2005 | Ritland et al. | |
| 6,946,182 B1 | 9/2005 | Allgeuer et al. | |
| 6,949,289 B1 | 9/2005 | Lawton et al. | |
| 7,104,077 B2 * | 9/2006 | Yabu et al. | 62/94 |
| 7,127,858 B2 | 10/2006 | Layfield | |
| 7,135,424 B2 | 11/2006 | Worley et al. | |
| 7,442,659 B2 * | 10/2008 | Moll | 442/394 |
| 7,501,011 B2 | 3/2009 | Powers et al. | |
| 7,504,346 B2 * | 3/2009 | Stepanian et al. | 442/59 |
| 7,718,252 B2 * | 5/2010 | Ito et al. | 428/309.9 |
| 7,732,372 B2 * | 6/2010 | Hampden-Smith et al. | 502/407 |
| 7,797,950 B2 * | 9/2010 | Brower et al. | 62/55.5 |
| 7,838,123 B2 * | 11/2010 | Chen et al. | 428/511 |
| 7,914,634 B2 * | 3/2011 | Moll | 156/60 |
| 8,034,740 B2 * | 10/2011 | Kitahata et al. | 502/407 |
| 2002/0010295 A1 | 1/2002 | Nishida | |
| 2002/0048552 A1 * | 4/2002 | Garrill et al. | 424/45 |
| 2002/0147242 A1 | 10/2002 | Salyer et al. | |
| 2002/0168535 A1 | 11/2002 | Proserpio | |
| 2003/0014982 A1 * | 1/2003 | Smith et al. | 62/106 |
| 2003/0033829 A1 * | 2/2003 | Smith et al. | 62/480 |
| 2003/0087576 A1 | 5/2003 | Yang et al. | |
| 2003/0109910 A1 | 6/2003 | Lachenbruch et al. | |
| 2003/0109911 A1 | 6/2003 | Lachenbruch et al. | |
| 2003/0205129 A1 | 11/2003 | Kretsinger et al. | |
| 2003/0215609 A1 * | 11/2003 | Burkart | 428/141 |
| 2004/0056054 A1 * | 3/2004 | Ottolangui | 222/544 |
| 2004/0072486 A1 | 4/2004 | Moll | |
| 2004/0076826 A1 | 4/2004 | Lee | |
| 2004/0103603 A1 | 6/2004 | Kunzel | |
| 2004/0118506 A1 | 6/2004 | Dong | |
| 2004/0211315 A1 | 10/2004 | Kretsinger et al. | |
| 2004/0224144 A1 | 11/2004 | Saari et al. | |
| 2005/0000183 A1 | 1/2005 | Fay et al. | |
| 2005/0011141 A1 | 1/2005 | Corwin | |
| 2005/0025925 A1 | 2/2005 | O'Connor | |
| 2005/0079352 A1 | 4/2005 | Glorioso et al. | |
| 2005/0208286 A1 * | 9/2005 | Hartmann et al. | 428/292.1 |
| 2006/0000155 A1 | 1/2006 | Wagner | |
| 2006/0165885 A1 | 7/2006 | Fay | |
| 2006/0257639 A1 | 11/2006 | Bianchi et al. | |
| 2006/0264133 A1 * | 11/2006 | Krajewski et al. | 442/104 |
| 2006/0283135 A1 | 12/2006 | Fellinger et al. | |
| 2007/0015424 A1 | 1/2007 | Toas et al. | |
| 2007/0125115 A1 * | 6/2007 | Matsui et al. | 62/331 |
| 2007/0234649 A1 | 10/2007 | Near et al. | |
| 2008/0020206 A1 | 1/2008 | Fay | |
| 2008/0236078 A1 | 10/2008 | Toas | |
| 2009/0071088 A1 * | 3/2009 | Viegas et al. | 52/406.1 |
| 2010/0015430 A1 | 1/2010 | Hartmann et al. | |
| 2010/0107550 A1 | 5/2010 | Toas et al. | |

FOREIGN PATENT DOCUMENTS

| | | | |
|---|---|---|---|
| DE | 199 15 311 | 4/1999 | |
| DE | 202006009620 * | 11/2006 | |
| EP | 0626255 A1 | 11/1994 | |
| EP | 1 209 298 | 5/2002 | |
| EP | 1 296 002 A2 | 3/2003 | |
| JP | 02016043 A * | 1/1990 | B32B 11/02 |
| JP | 08215001 A * | 8/1996 | |
| JP | 2002-172739 | 6/2002 | |
| JP | 2002178444 A * | 6/2002 | B32B 13/02 |
| WO | WO 00/09624 | 11/2000 | |
| WO | WO 01/23125 | 4/2001 | |
| WO | WO 02/070251 | 9/2002 | |
| WO | 2008021145 A1 | 2/2008 | |
| WO | 2008/121716 A2 | 10/2008 | |

(56) References Cited

FOREIGN PATENT DOCUMENTS

| | | |
|---|---|---|
| WO | 2010008910 A1 | 1/2010 |
| WO | 2011130657 A2 | 10/2011 |

OTHER PUBLICATIONS

Abaza, H.F. The Use of Attic Space for Cooling and Dehumidification, International Refrigeration and Air Conditioning Conference, Paper 536, 2002, available at http://docs.lib.purdue.edu/cgi/viewcontent.cgi?article=1535&context=iracc (last accessed on Jun. 13, 2012).*
Lstiburek, Joseph. "Vapor Barriers and Wall Design," Research Report—0410. Building Science Press, Nov. 2004.*
Abaza, Hussein F. "Utilizing Latent Building Thermal Mass for Dehumidification" Journal of Building Physics 2005 29:37.*
Admer, http://wvvw.mitsuiplastics.com/products/28admere.html. Mar. 6, 2005, 1pg. (EVOHcoextrusions).
Rafael Auras, "Translation of water vapor transmission values from ASTME E-96-00 to ISO 12572-2001 (E)" , 7 pp (Auras Translation ASTME96-ISO12572-01), Mar. 12, 2005.
Chougule et al., Development of Novel Barrier Heat Seal Layers with Reduced Absorption Using Smart Blending Technology, prior to Mar. 30, 2005.
Cooksey et al., "Predicting Permeability & Transmission Rate for Multilayer Material," Foodtechnology, Sep. 1999, vol. 53, No. 9, pp. 60-63, (Multilayer-FilmWVT).
Del Noble et al., A New Approach to Predict the Water-transport Properties of Multilayer Films Intended for Food-packaging Application, Journal of Food Science, vol. 69, No. 3, pp. FEP85-FEP90 (Del Nobile EVOH), 2004.
EVAL Americas, What are EVAL™ Resins?, http://www.eval.be/web/tpll.asp?lang=A&ut=L&hmain=3&hdetail=18&stype=X&top=N, Mar. 27, 2005, 1 pg. (EvalEVOH), prior to Mar. 27, 2005.
Huang et al., "Morphological, Thermal, Barrier and Mechanical Properties of LDPE/EVOH Blends in Extruded Blown Films," Journal of Polymer Research 11:75-83, 2004 (Huang).
INTELLO® Technical Data, prior to Mar. 2005.
Lee et al., "Effect of Compatibilizer on the Crystallization, Rheological, and Tensile Properties of LDPE/EVOH Blends," Journal of Applied Polymer Science, 1998, vol. 68, 1245-1256, South Korea.
Mechanical, Optical and Miscellaneous Properties of Eval® Resins and Films, 6 pp. (EVAL Tech Data), prior to Mar. 2005.
Physical Properties of EVAL™ Film, 1 pg. (EVAL Film Data), prior to Mar. 2005.
Soarnal® Technical Note, Water Vapor Permeability and Moisture Absorption / Water Absorption, Nippon Gohsei (Soarnal_s_data 15), Sep. 2003.
Soarnol®, What is Soarnol?, (SoaranoEVOH), Jan. 2005.
SOARUS, L.L.C. http://www.soarus.com/soarnol/soarnol.html, Jan. 6, 2005, 1 pg. (SoarnusEVOH).
STEDIM, http://www.stedim/com/p3A_Stedim71datasheet.php, Mar. 27, 2005, 1 pg. (EVOHcoextrusion).
The feature in the summer of Xavan Bf (Xavan Bf), prior to Mar. 2005.
International Search Report in PCT/IB2006/002112, dated Jun. 12, 2006.
International Search Report in PCT/US00/11461, dated Sep. 8, 2000.
European Search Report in EP 00 61 0119, dated Mar. 12, 2001.
Office Action dated Apr. 11, 20007 in U.S. Appl. No. 11/1812,383.
Office Action dated Jul. 19, 2007 in U.S. Appl. No. 11/1812,383.
Office Action dated Jun. 18, 2008 in U.S. Appl. No. 11/1812,383.
Office Action dated Oct. 29, 2008 in U.S. Appl. No. 11/1812,383.
International Search Report in PCT/US08/58451, dated Nov. 3, 2008.
Changes of Phase (or State) http://id.mind.net/~mstm/physics/mechanics/energy/heatAndTemperature/changes OFP . . . , website accessed May 6, 2004, 4 pages.
"Phase Change Drywall," U.S. Department of Energy, Office of Energy Efficiency and Renewable Energy, Consumer Energy Information: EREC Reference Briefs, Aug. 2002, 5 pages.
Rubitherm® RT 26, Phase Change Material Based on n-Paraffins and Waxes, Innovative PCM's and Thermal Technology Product Information, Rubitherm GmbH, Jun. 20, 2002, 2 pages.
Rubitherm® RT 20, Phase Change Material Based on n-Paraffins and Waxes, Innovative PCM's and Thermal Technology Product Information, Rubitherm GmbH, Aug. 9, 2002, 2 pages.
Rubitherm® RT 27, Phase Change Material Based on n-Paraffins and Waxes, Innovative PCM's and Thermal Technology Product Information, Rubitherm GmbH, Jun. 20, 2002, 2 pages.
Rubitherm® PX, Latent Heat Powder Based on Paraffins and Waxes, Innovative PCM's and Thermal Technology Product Information, Rubitherm GmbH, Jul. 31, 2002, 2 pages.
Rubitherm® GR, Latent Heat Granulate Based on Paraffins and Waxes, Innovative PCM's and Thermal Technology Product Information, Rubitherm GmbH, Jul. 31, 2002, 2 pages.
TH 29° C. Phase Change Material (PCM), TEAP Energy, http://www.teappcm.com/teap_29c.html, website accesssed Apr. 13, 2004.
Monthly Progress Report No. 6, Contract No. DE-FG03-86SF16308, covering Nov. 1986, DOE Solar Passive Division, University of Dayton Research Institute's investigation of PCM's.
Salyer, Ival O. et al., "Advanced Phase Change Materials and Systems for Solar Passive Heating and Cooling of Residential Buildings," Final Technical Report Covering the Period of May 29, 1986 though Jul. 15, 1988, University of Dayton Research Institute.
Rosenbusch and Holcomb, "The Benefits of Microspheres", PCI, 2004, pp. 1-4.
Watkins, Lou, "New Pipeline Insulation Technogy [sic] Introduced", Pipeline & Gas Journal, Apr. 2002, pp. 1-2.
Cuming Corp, "Thermal and Insulating Properties of Syntactic Foam", Technical Note 100-5, undated, pp. 1-2.
Office Action dated Apr. 8, 2008 in U.S. Appl. No. 10/869,994.
Office Action dated Jun. 18, 2008 in U.S. Appl. No. 10/869,994.
Corresponding PCT/US2010/053120 Dec. 14, 2010 International Search Report & Opinion.
Rudd, A.F. and Lstiburek, J.W., "Vented and Sealed Attics in Hot Climates", ASHRAE Symposium on Attics and Cathedral Ceilings, Toronto, Jun. 1997, pp. 1-14.
Abaza, Hussein, "Utilizing Latent Building Thermal Mass for Dehumidification", J. Bldg Physics, vol. 29, No. 1, 37-49 (2005) Abstract, 1 pg.
"Desiccant Chart Comparisons", Sorbent Systems, 2006, pp. 1-4.
"Bulk Desiccant", AGM Container Controls, Inc., Oct. 31, 2006, pp. 1-3.
Huang, Y.J. et al., "Residential Heating and Cooling Loads Components Analysis", LBNL-44636, Lawrence Berkeley National Laboratory, Berkley, California, (1999), pp. 1-13.
Florida Solar Energy Center, 1992, "FSEC 3.0 User's Manual," FSEC-GP-47-92.
Kerestecioglu, A., M. Swami; 1990, "Theoretical and Computational Investigation of Simultaneous Heat and Moisture Transfer in Buildings: Effective Penetration Depth Theory." ASHRAE Winter Meeting, Atlanta, GA, pp. 447-454.
Gu, L., J.E. Cummings, M.V. Swami & P.W. Fairey, "Comparison of Duct Computer Models That Could Provide Input to the Proposed Thermal Distribution Standard Method of Test", Symposium of 1998 ASHRAE Winter Annual Meeting, San Francisco, 1998, pp. 1-11.
Gu, L., J.E. Cummings, M.V. Swami & P.W. Fairey 2003, "System Interactions in Forced-Air Heating and Cooling Systems, Part I: Equipment Efficiency Factors," CH-03-7-1 (RP-1165), ASHRAE Transactions 109 (1), pp. 475-484.
Gu, L., J.E. Cummings, M.V. Swami & P.W. Fairey 2003, "System Interactions in Forced-Air Heating and Cooling Systems, Part II: Continuous Fan Operation," KC-03-01 (RP-1165), ASHRAE Transactions 109 (2), pp. 371-379.
Admer, http://www.mitsuiplastics.com/products/28admere.html, Mar. 6, 2005, 1 pg (EVOHcoextrusions).
ASTM E96 Test Data from test performed before Mar. 2005 (Marais EVA).
Rafael Auras, Translation of water vapor transmission values from ASTME E-96-00 to ISO 12572-2001 ( E ), 7 pp. Auras Translation values from ASTME96-ISO12572-01 Mar. 12, 2005.

(56) References Cited

OTHER PUBLICATIONS

Chougule et al., Development of Novel Barrier Heat Seal Layers with Reduced Absorption Using Smart Bnelding Technology, prior to Mar. 30, 2005.
Cooksey et al., "Predicting Permeability & Transmission Rate for Multilayer Material", Foodtechnology, Sep. 1999, vol. 53, No. 9, pp. 60-63 (Multilayer-FilmWVT).
Del Nobile et al., A New Approach to predict the Water-transport Properties of Multilayer films Intended for Food-packaging Application, Journal of Food Science, vol. 69, No. 3, pp. FEP85-FEP90 (Del Nobile EVOH).
EVAL Americas, EVAL E171 Data Sheet (EVAL Data Sheets), Aug. 2004.
EVAL Americas, What are EVAL Resins Mar. 27, 2005, 1 pg. (EVALEVOH), prior to Mar. 27, 2005.
Gatland, Comparison of Water Vapor Permeance Data of Common Interior Building Materials in North American Wall Systems, May 2005, pp. 182-194, Ottawa, Canada (Gatland).
Huang et al. "Morphological, Thermal, barrier ad Mechanical Properties of LDPE/EVOH Blends in Extruded Blown Films", Journal of Polymer Research 11:75-83. 2004 (Huang).
INTELLO Technical Data, prior to Mar. 2005.
Lee et al., "Effect of Compatibillizer on the Crystallization, Rheological, and Tensile Properties of LDPE/EVOH Blends," Journal of Applied Polymer Science, 1998, vol. 68, 1245-1256, South Korea.
Marais et al., "Transport of Water and Gases through EVA/PVC blend films-permeation and DSC investigations," Elsevier, Polymer Testing, 2003, pp. 475-486.
Mechanical, Optical and Miscellaneous Properties of Eval Resins and Films, 6 pp. (EVAL Tech Data), prior to Mar. 2005.
NOLTEX, Film Application (NoltexEVOHcoextrusions), prior to Mar. 2005.
Physical Properties of EVAL Film, 1 pg. (EVAL Film Data), prior to Mar. 2005.
Soarnal Technical Note, Water Vapor Permeability and Moisture Absorption/ Water Absorption, Nippon Gohsei (Soarnal_s_data 15), Sep. 2003.
Soarnol, What is Soarnol?, (SoaranoEVOH), Jan. 2005.
SOARUS, L.L.C.http://www.soarus.com/soarnol.soarnol.html, Jan. 6, 2005, 1 pg (SoarusEVOH).
Stedim, http://www.stedim.com/p3A_Stedim71datasheet.php, Mar. 27, 2005, 1 pg (EVOHcoextrusion).
Zhang, et al., Permeation of Oxygen and Water Vapor Through EVOH Films as influenced by relative Humidity, Journal of Applied Polymer Science, 2001, p. 1866-1872, vol. 82.
The feature in the summer of Xavan BF (Xavan), prior to Mar. 2005.
Kunzel, Hartwig M. "Performance of Innovative Vapor Retarders Under Summer Conditions," Ashrae Transactions 2001, V. 107, pt. 1 pp. 1-4.
Permeability, EVOH-29 Film, 5 pages, 1997.
Changes of Phase (or State) http://id.mind.net/~mstm/physics/mechanics/energy/heatAndTemperature/changesOfP . . . , website accessed May 6, 2004, 4 pages.
"Phase Change Drywall," U.S. Department of Energy, office of Energy Efficiency and Renewable Energy, Consumer Energy Information: EREC Reference Brief, Aug. 2002, 5 pages.
"Phase Change Materials for Solar Heat Storage," U.S. Department of Energy, office of Energy Efficiency and Renewable Energy, Consumer Energy Information: EREC Reference Briefs, Mar. 2003, 6 pages.
Rubitherm RT 26, Phase Change Material Based on n-Paraffins and Waxes, Innovative PCM's and Thermal Techbology Product Information, Rubitherm GmbH, Jun. 20, 2002, 2 pages.
Rubitherm RT 20, Phase Change Material Based on n-Paraffins and Waxes, Innovative OCM/s and Thermal Technology Product Information, Rubitherm GmbH, Aug. 9, 2002, 2 pages.
Rubitherm RT 27, Phase Change Material Based on n-Paraffins and Waxes, innovative PCM's and Thermal Technology Product Information, Rubitherm GmbH, Jun. 20, 2002, 2 pages.
Rubitherm PX, Latent Heat Powder based on paraffins and Waxes, innovative PCM's and Thermal Technology Product Information, Rubitherm GmbH, Jul. 31, 2002, 2 pages.
Rubitherm GR, Latent Heat Granulate Based on Paraffins and Waxes, Innovative PCM's and Thermal Technology Product Information, Rubitherm GmbH, Jul. 31, 2002, 2 pages.
PCM Thermal Solutions, Thermal Management Through the Use of Phase Change Materials (PCM's), TEAP Energy TEA 29 PCM Capsules, http://www.pcm-solutions.com/tea29.html, website accessed Apr. 12, 2004.
TH 29C Phase Change Material (PCM), TEAP Energy, http://www.teappcm.com/teap_29c.html, website accessed Apr. 13, 2004.
Monthly Progress Report No. 6, Contract No. DE-FG03-865F16308, covering Nov. 1986, DOE Solar Passive Division, University of Dayton Research Institute's investigation of PCM's.
Salyer, Ivalo. Et al., "Advanced Phase Change Materials and Systems for Solar Passive Heating and Cooling of Residential Buildings," Final Technical Report Covering the Period of May 29, 1986 through Jul. 15, 1988, University of Dayton Research Institute.
Kedl, R.J., "Conventional Wallboard with Latent Heat Storage for Passive Solar Applications," Oak Ridge National Laboratory, Oak Ridge, TN, pp. 222-225.
Allen et al., "Advances in Microsphere Insulation Systems", CEC C2-C-01, 2003, pp. 1-8.
Carlson, Krista, "Production of Hollow Glass Microspheres from Amber Glass Frit", undated, pp. 1-7.
Rosenbusch and Holcomb, "The Benefits of Microspheres", PCI, 2004, p. 1-4.
Watkins, Lou, "New Pipeline Insulation Technology [sic] introduced", Pipeline & Gas Journal, Apr. 2002, pp. 1-2.
Uming Corp, "Thermal and Insulation Properties of Syntactic Foam", technical note 100-5, undated, pp. 1-2.
Hy-Tech Thermal Solutions, "Ceramic Paint Additive Makes any Paint Insulate", 2003-2004, pp. 1-4.
Expancel, The Products, Applications, Questions & Answers, Trade Literature, Jul. 6, 2006, pp. 1-8.
Rudd. A.F. and Lstiburek, J.W., "Vented and Sealed Attics in Hot Climates", ASHRAE Symposium on Attics and Cathedral Ceilings, Toronto, Jun. 1997, pp. 1-14.
Abaza, Hussein, "Utilizing Latent Building Thermal Mass for Dehumidification", J. Bldg Physics, vol. 29., No. 1, 37-49 (2004) Abstract, 1 pg.
"Desiccant Chart Comparisons", Sorbent Systems, 2006 pp. 1-4.
"Construction Details Insulating System, residential Attic Spaces", Owens Corning, Aug. 1997, 4 pp.
"Energy Efficiency in Remodeling: Roofs & Ceilings", Toolbase Services, 2001-2006, pp. 1-6.
Gu, L., J.E. Cummings, M.V. Swami & P.W. Fairey, "Comparison of Duct Computer Models That coukd Provide Input to the Proposed Thermal Distribution Standard Method of Test", Symposium of 1998 ASHRAE Winter Annual Meeting, San Francisco, 1998, pp. 1-11.
CertainTeed Specification Sheet "MemBrain™, The SMART Vapor Retarder" Mar. 2008.
U.S. Appl. No. 13/799,863, filed Mar. 13, 2013.
Gu, L., J.E. Cummings, M.V. Swami & P.W. Fairey 2003, "System Interactions in Forced Air Heating and Cooling Systems, part 1: Equipment Efficiency Factors," CH-03-7-1 (RP-1165) AsSHRAE Transactions 109 (1), pp. 475-484.
Gu, L., J.E. Cummings, M.V. Swami & P.W. Fairey 2003, "Systems Interactions in Forced-Air heating and Cooling Systems, Part II: Continuous Fam Operation," KC-03-01-(RP-1165) ASHRAE Transactions 109 (2), pp. 371-379.
Lixing Gu "Contract Report: Examine Potential Energy Savings Using Ceiling Insulation Mixed with Desiccant" Dec. 19, 2005 (unpublished), pp. 1-35.

\* cited by examiner

□ 10% Silica □ 20% Silica (Based on the Volume of Cellulose Insulation)

ATTIC AND WALL INSULATION WITH DESICCANT

This application is a continuation-in-part of U.S. patent application Ser. No. 11/694,220, filed Mar. 30, 2007, which is expressly incorporated by reference herein in its entirety.

FIELD OF THE INVENTION

The present invention relates to insulation products, such as batt and loose-fill insulation, and board products such as duct liner and duct boards, having better thermal properties for cooling dominated climates.

BACKGROUND OF THE INVENTION

Most residential construction includes an attic space between the ceiling and the roof deck. The structure that supports the roof and provides the ceiling plane is often constructed with pre-assembled wood trusses. The structure can also be built on-site using traditional ceiling joists and roof rafters. Properly insulating the attic is essential to reducing home energy consumption ("building load"). Thermally isolating the attic from the rest of the house also increases the comfort of the living space below in both winter and summer.

Attic ventilation serves two purposes: prevention of moisture condensation in the winter and attic cooling in the summer. Ventilation during the heating season removes moisture-laden air from the attic before it condenses. Summer-time venting allows cooler air to flush heat out of the attic space. Typically, a good ventilation system has 50 percent of the required ventilation area high on the roof and 50 percent in the eave area. With properly spaced vents, the attic will have good circulation. Batt insulation is often a good bet for long-term thermal performance. Loose-fill insulation may also be used, including cellulosic and glass fiber loose-fill insulation. Loose-fill insulation should be installed at the same thickness throughout the attic. Voids and low spots should be eliminated.

Despite the many attempts to properly insulate attics, the attic space of most buildings is perceived as a source of a nuisance. In winter, moisture condensation on the attic ceiling encourages mildew growth. In summer, the heat build-up in the attic space increases the cooling load. Generally during the night, the high attic air relative humidity is caused by an air exchange with the outdoor environment. The wood framing materials, generally having a lower air relative humidity at the surface, adsorb moisture. During the daytime the attic air relative humidity is reduced due to the heat gain caused by solar heat. There is a higher air or relative humidity at the surface of the wood framing materials which results in moisture being desorbed by wood attic framing materials. The attic space during the daytime will typically be elevated in relative humidity above the outdoor environment.

In modern residences, the challenge of achieving a continuous air infiltration barrier and thermal insulation barrier at the interior ceiling level is especially difficult. The air barrier, used to isolate the living space from the attic, is usually the taped drywall ceiling, while the thermal barrier is the insulation placed on top of the drywall. The ceiling may not be a single horizontal plane, but a series of horizontal planes, vertical planes (knee walls), and sloped planes, all intersecting to create the ceiling.

Some building codes across the United States currently require attic ventilation. Lstiburek, "Vented and Sealed Attics in Hot Climates" ASHRAE SYMPOSIUM ON ATTICS AND CATHEDRAL CEILINGS, TORONTO, (JUNE, 1997). In cold climates, the primary purpose of the attic ventilation is to maintain a cold roof temperature to avoid ice damage created by melting snow, and to vent moisture that moves from the conditioned space to the attic. Id., p. 3 Melted snow, in this case, is caused by heat loss from the conditioned space. When water from melted snow runs out over the unheated eave portion of the house, it freezes and expands, often driving its way back up the roof and between shingles. Id.

In hot climates, the primary purpose of attic ventilation is to expel solar heated hot air from the attic to lessen the building cooling load. Id., p. 4 Roof shingle temperatures will be higher during no-wind conditions leading to a higher heat load on the attic. Id. Therefore, the greatest need for attic ventilation is when there is a little wind pressure to force air in and out of the attic.

Building heating and cooling loads from roofs for all single-family detached buildings were estimated to be 446 trillion BTUs for heating and 128 trillion BTUs for cooling in the U.S. in 1999. Y. J. Huang et al. "Residential Heating and Cooling Loads Components Analysis," LBNL-44636, Lawrence Berkeley National Laboratory, Berkley, Calif., (1999). Compared to the total net heating and cooling loads (through roof plus walls plus floors), the percent of roof loads are 15.1 percent (heating) and 15.8 percent (cooling), respectively. Therefore, roof load reduction can greatly reduce the total building loads. Although there are many ways to reduce roof loads, the most common way is to add more roof insulation. Due to limited attic space, adding more roof insulation may not always be a feasible way to reduce the total building loads in many instances.

Accordingly, there remains a desire to reduce total energy usage by alternative means.

SUMMARY OF THE INVENTION

A method of reducing the amount of cooling energy required to cool a building is provided. The building generally includes an enclosed room partially defined by an outer wall, a horizontal upper wall plate, and an attic space exposed above the upper wall plate. The attic space is defined by a ceiling of the room and a roof of the building. The method includes the steps of (1) disposing a porous insulating material substantially covering the ceiling in said attic space to a substantial depth, the porous insulating material including a desiccant, (2) permitting the desiccant-bearing fibrous insulating material to adsorb water moisture from the attic space, and (3) permitting the adsorbed water moisture to desorb from the desiccant-bearing fibrous insulating material into the enclosed room, whereby the temperature of the desiccant-bearing fibrous insulating material is reduced resulting in a reduction in the amount of cooling energy required to cool the building.

In some embodiments of the present invention, the desiccant is a silica gel which is added to loose-fill or batt insulation used in attics in climates dominated by a cooling. As a result of the heat energy in the attic expended in evaporating the moisture in the silica gel in the insulation in the summer cooling season, the heat flow from the attic into the living space is reduced. The simulated, calculated net energy savings in a 1500 square-foot house in Miami with a 20 percent silica gel content (by volume) in R30 insulation can potentially reduce net annual energy costs by about $50.00.

The silica gel, or other desiccant, such as montmorillonite clay, synthetic zeolite (molecular sieve), calcium oxide (CaO), calcium sulfate ($CaSO_4$), carbon molecular sieve, activated alumina, or activated carbon, or sodium polyacrylate, for example, may be added to the preferred mineral fiber or cellulose insulation during the manufacturing process. For blanket mineral fiber insulation, the silica gel, for example, may be added to the forming section as a dry powder blown into the upper area of the forming section of a rotary fiber glass plant (similar to the manner that admix materials are typically added today) and/or mixed with the mineral fibers and binder in the forming section as an applied coating or ingredient, for example. The silica gel in a water slurry form may also be added to mineral fiber insulation in the forming section by spraying the slurry onto the hot mineral fibers. For mineral fiber loose-fill insulation, the silica gel may be added as a dry powder to the mineral fibers in the forming section or to the mineral fibers in the blowing machine hopper before the insulation is blown into the attic or wall. For cellulose insulation, the silica gel may be added to the cellulose insulation in the manufacturing process at the time the fire retardant, for example, is added to the shredded cellulose or to the mineral fibers in the blowing machine hopper before the insulation is blown into the attic.

In computer simulation models, it was determined that negative heat flux flowing from the living space into the attic increases due to higher thermal conductivity of the desiccant insulation mixture containing cellulose and silica gel in the winter climate. Additionally, negative moisture fluxes flowing from the living space into the attic were reduced to a very small amount due to the high level of moisture in the desiccant insulation mixture in the winter. These results were compared to a cellulose only insulation control in the attic space during the same climate conditions. In the summer months, the fiber glass insulation with silica gel resulted in a reduced positive heat flux flowing from the attic into the living area, in the model, since heat energy in the attic was being used to evaporate moisture from the desiccant. It also resulted in an increase in the positive moisture flux flowing from the attic into the living area due to extra moisture from evaporation from the desiccant into the living area. In the cooling dominated climate of Miami, the addition of desiccant to the attic insulation reduced the total roof energy load in the computer models of this embodiment. In heated dominated climates like Baltimore, Minneapolis, and San Francisco, the addition of desiccant to the insulation increased, rather than decreased, the total roof energy load in computer simulations.

Accordingly, some embodiments incorporating desiccant into attic insulation are designed to assist "cooling dominated climates," such as Miami, where the average monthly temperature is above 45° F. year round, as opposed to "heat dominated climates," which typically experience between 4500 and 8000 heating degree days. In heating dominated climates, the dry air is outside and the moist air is inside. In the Southern United States where most cooling dominated climate constructions are located, the conditions are exactly the opposite. The air conditioners create dry air inside the dwelling, while the outside air is very humid most of the year.

In further embodiments of the present invention, a building insulation material is provided which includes randomly oriented fibers made of a cellulosic or inorganic composition disposed in a substantial thickness to provide insulation for a building, and a desiccant in an amount sufficient to enable said insulating material to absorb enough water moisture to reduce the temperature of said insulating material by at least 1° F.

In a further embodiment of the present invention, a method of manufacturing an insulating material is provided which includes the steps of forming glass fibers from molten streams of glass, combining glass fibers with a desiccant, and consolidating the fibers and desiccant on a conveyor.

In still a further embodiment of the present invention, a method of manufacturing cellulosic insulation material is provided which includes the step of forming cellulosic fibers from a paper source and admixing a fire retardant and desiccant onto the cellulosic fibers.

In some embodiments, the porous insulating material includes a first layer and a second layer, and the desiccant is disposed in a separate layer between the first layer and the second layer.

In still a further embodiment, a method is provided for reducing the amount of cooling energy required to cool and heat a building. The building has an enclosed room partially defined by a wall, a horizontal upper wall plate, and an attic space disposed above the upper wall plate. The attic space is defined by a ceiling of the room and a roof of the building. The wall comprises an inner panel and an outer panel with a wall space therebetween. The method comprises disposing a first layer and a second layer of porous insulating material so as to substantially cover the ceiling in the attic space or the inner panel in the wall space with a separate layer comprising a desiccant material disposed in between the first and second layers of porous insulating material. The layer comprising the desiccant material is permitted to adsorb water moisture from the attic space or wall space. The adsorbed water moisture is permitted to desorb from the layer comprising the desiccant material into the enclosed room. The absorption and desorption of water from the desiccant results in a reduction in the total amount of cooling energy required to cool the building and heat energy to heat the building.

The above and other features of various embodiments of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Figure 1:
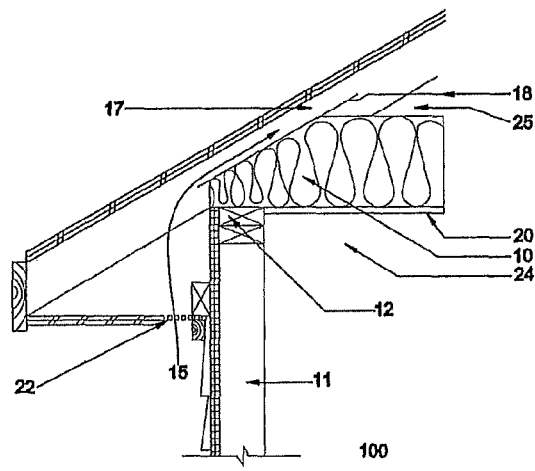
FIG. 1 is a partial cross-sectional side elevational view of an eave area of a building.

One of several alternative methods, proposed herein, is to change roof insulation characteristics by mixing desiccant material with a porous insulation material, such as fiber glass or cellulose insulation. In general, there are two main advantages to this process. The first is to add more thermal mass to the ceiling insulation when the desiccant adsorbs moisture which can lead to possible load shifting from peak to off-peak hours. The second is to reduce attic air moisture levels. The disadvantage with this method of adding a desiccant is that the thermal resistance of the insulation decreases somewhat due to the higher thermal conductivity of the desiccant compared to fiber glass or other insulation.

In addition to the general advantages and disadvantages of the desiccant insulation mixture mentioned above, one of the most important features of using the ceiling mixture is to add more moisture adsorption capacity. The moisture adsorption from the attic and desorption to the living space from the convective mass transfer at the ceiling surface can change the temperature of the ceiling insulation. Therefore, building energy loads can be changed due to the temperature change of the ceiling insulation, resulting in a change in the amount of heat that flows between the attic and the living space. The change may have a benefit in reducing cooling energy and conversely requiring more heating energy.

The desiccant can be added in amounts of at least about 5% v/v, preferably at least about 10-20% v/v (by volume of insulation, such as glass fiber or cellulosic insulation). By adding desiccant, such as silica gel for example, into the ceiling cellulose insulation, thermal conductivity increases 31% and 62% for the mixtures, with mixing ratios by volume of 10% and 20% desiccant, compared to ceiling insulation containing only cellulose, so that ceiling heat fluxes through the insulation increase due to the increased thermal conductivity. However, since silica gel is able to absorb a large amount of moisture from its surroundings and store it, the moisture level in the mixture insulation increases. When the moisture level in the attic space is lower than indoor living area humidity levels, the moisture flows from the indoor living area to the attic space. This is generally true in winter with an attic insulated with cellulose only. When the silica gel moisture adsorber is added to the insulation in the attic, the moisture primarily adsorbs and desorbs from the same place, the attic zone. Moisture flux from the attic into the living room space is reduced to a very low level in winter, due to the increased moisture level in the mixture. Therefore, moisture flow in an attic with a silica gel-cellulose mixture insulation does not interfere with the direction of the heat transfer, so that heating energy use increases due to the increased thermal conductivity of the silica gel-cellulose mixture ceiling insulation.

When the moisture level in the attic is higher than the indoor humidity level, which is generally true in summer, moisture evaporates from the silica gel-cellulose mixture insulation absorbed from the relatively wet attic space and is released and flows into the living zone. The moisture evaporation absorbs heat and causes the ceiling temperature in the attic insulated with the silica gel moisture to be lower compared to the cellulose only attic. As long as the amount of heat flux flowing from the attic into the living space reduced by the moisture evaporation is larger than the amount of heat flow increased by the insulation mixture's increased thermal conductivity, the total heat flux flowing into the living space from the mixture ceiling insulation is less than the cellulose insulation. Therefore, cooling energy use is expected to decrease with the silica gel-cellulose mixture insulation.

Figure 2:
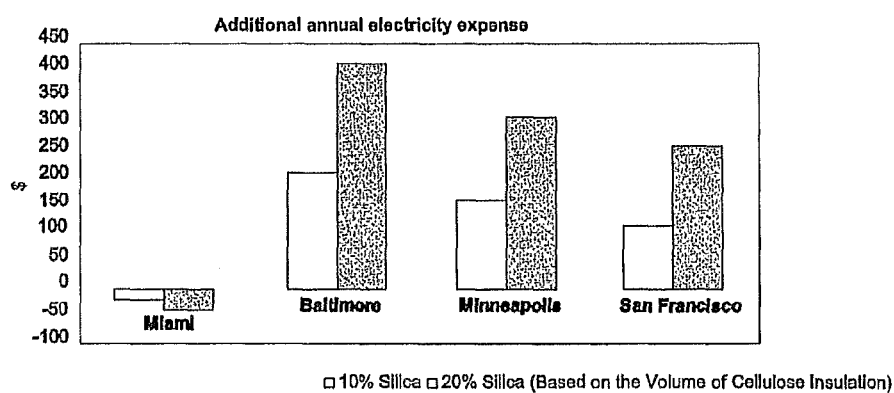
FIG. 2 is a bar chart illustrating the reduced (or additional) annual electricity expense in U.S. dollars for a 10% and 20% mixing ratio of silica gel by volume in cellulosic ceiling insulation in four locations in the United States, developed through computer modeling.

As shown in the figures, and particularly FIGS. 1 and 2 thereof, this embodiment is directed to a method of reducing the amount of cooling energy required to cool a building 100. The building 100 includes an enclosed room 24 partially defined by an outer wall 11, a horizontal upper wall plate 12, and an attic space 25 disposed above the upper wall plate 12. The attic space 25 is defined by a ceiling 20 of the room 24 and a roof of the building 100. The method includes disposing a porous insulating material 10, preferably not a closed cell insulation structure like extruded polystyrene foam boards or spray polyurethane foam, substantially covering the ceiling 20 in the attic space 25 to a substantial depth. The porous insulating material 10 includes a desiccant. The method also includes permitting the desiccant-bearing porous insulating material 10 to adsorb water moisture from the attic space 25. The next step in the preferred method includes permitting the adsorbed water moisture to desorb from the desiccant-bearing porous insulating material 10 and into the enclosed room 24. By this process, the temperature of the desiccant-bearing porous insulating material 10 is reduced resulting in a reduction in the amount of cooling energy required to cool the building 100. As in typical constructions, the building 100 of FIG. 1 includes an eave having a soffit 22 and an attic air vent 18 for permitting air flow 15 from the soffit up to the attic 25, and preferably out a vent fan or roof vent (not shown). The flowing air 15 travels through a space defined by the attic vent 18 and a pair of rafters 17 which support the roof.

In some embodiments of this invention, the porous insulating material 10 preferably comprises inorganic or cellulosic fibers. Typical inorganic fibers include mineral wool or rotary glass fibers or textile glass fibers, and typical cellulosic fibers include recycled paper fibers which are treated with a fire-resistant additive prior to use.

In methods according to some embodiments of this invention, water moisture desorbs from the desiccant-bearing porous insulating material through the ceiling 20 and into the enclosed living area room 24 by convective mass transfer. These preferred methods work best in cooling dominated climates such as those where the average monthly temperature is above 45° F. year round. In cooling dominated climates like southern Florida, for example, the relative humidity in the attic space 25 is typically higher than the relative humidity in the living space room 24, and the buildings typically experience an exterior temperature greater than 72° F. for a significant portion of the year. In such buildings, the typical construction includes spaced-apart attic floor joists disposed above an upper wall plate 12, and spaced-apart roof rafters 17 disposed below and supporting a roof of the building 100. In some embodiments of this invention, the desiccant-bearing porous insulating material 10 is disposed at least between the attic floor joists. Additionally, the desiccant-bearing porous insulating material 10 of this embodiment can be disposed between joists supporting a cathedral ceiling in which there is relatively little attic space between the ceiling 20 and the roof. In either case, where there is a substantial attic, or barely enough room for an attic vent 18 to permit flowing air 15 to pass through, the desiccant-bearing porous insulating material 10 of this embodiment is capable of reducing a relative humidity level in the attic space or the area located between the ceiling 20 and the roof. Alternatively, in building construction, where there is an outer wall defined by a plurality of substantially parallel studs, an outer sheathing, and an inner drywall layer, the desiccant-bearing porous insulating material 10 can further be disposed between the outer sheathing and the inner drywall layer.

In a further preferred embodiment of the desiccant-bearing porous insulating material 10, randomly oriented fibers made of cellulosic or inorganic composition are disposed in a substantial thickness to provide insulation for a building 100. A desiccant is provided in an amount sufficient to enable the insulating material to absorb and desorb enough water moisture to reduce the heat flux through the desiccant filled insulation.

Preferably, the reduction in temperature also occurs at the ceiling 20 when the adsorbed water is desorbed into the living space of room 24 by convective mass transfer. Such building insulation material 10 can be disposed in the form of a blanket, loose fill, or batt insulation product. In the preferred embodiment of this invention, the desiccant is a highly porous solid absorbent material that absorbs moisture from its surroundings and has a large moisture storage capacity. Preferred desiccants include one or more of the following ingredients: montmorillonite clay, silica gel, synthetic zeolite (molecular sieve), calcium oxide (CaO), calcium sulfate ($CaSO_4$), carbon molecular sieve, activated alumina, or activated carbon, or sodium polyacrylate. One exemplary desiccant is silica gel. The silica gels can include, for example, POLYLAM Products, Corporation white beaded and powdered silica and Grays Davidson Syloid® and Sylox® powders and Ludox® colloidal silica dispersions. Other desiccants that may be used include a surface modified carbon based desiccant, particle size between 50 and 500 microns, sold by NanoPore, Inc. of Albuquerque, N. Mex., NatraSorb S silica gel sold by Multisorb Technologies, Inc. of Buffalo, N.Y., Multisorb NatraSorb M Montmorillonite clay, Multisorb Drikette desiccant in paper, and NanoPore carbon based desiccant in felt.

The preferred desiccant generally comprises at least about 1 wt. % and preferably at least about 5 wt. % and more preferably 10% to 20% by weight based upon the dry weight of the randomly oriented fibers or other porous insulation. The desiccant can be provided in a uniform mixture of silica gel either in a dry form or added to water to form a slurry which is introduced into the randomly oriented fibers. In dry form the fibers and the desiccant can be consolidated onto a conveyer such as those typically used in the process of collecting rotary fibers in a glass batt manufacturing process. When the desiccant is added to the fibers, the glass fibers can still be hot or they can be cooled to ambient temperature. In dry form the desiccant can be blown into an upper area of the forming suction of a rotary glass manufacturing plant. Alternatively, the desiccant can be added to a water slurry and sprayed onto the hot mineral fibers in a forming section of a rotary glass plant.

The preferred methods of adding desiccant onto cellulosic fibers can include spraying the cellulosic fibers, or dipping them into a liquid desiccant or adding both dry desiccant and fire retardant to the cellulosic fibers at the same time or in subsequent steps. In one method, the dry desiccant is added to the fire retardant-containing cellulosic fibers in a blowing machine hopper before the fire retardant—containing cellulosic fibers are blown into an attic cavity, wall cavity or crawl space of the building.

Computer Simulation Example

A computer modeling study (Lixing Gu "Contract Report: Examine Potential Energy Savings Using Ceiling Insulation Mixed with Desiccant" Dec. 19, 2005 (unpublished)) was performed to determine the effects of desiccant—insulation mixtures on heat fluxes and building loads. The objective was to determine, through the use of building simulations, the potential energy savings by adding different concentrations of desiccant material to cellulosic ceiling-attic insulation and to examine ceiling peak load shifting due to the added thermal mass in the ceiling insulation. In addition, the attic humidity level due to moisture adsorption and desorption from added desiccant was modeled.

To evaluate the effects of sealed attics, in both heat dominated and cooling dominated climates, the computer modeling study was conducted for the Miami, Baltimore, Minneapolis and San Francisco climates. The computer model utilized was the FSEC 3.0 program (Florida Solar Energy Center, 1992, "FSEC 3.0 User's Manual," FSEC-GP-47-92; the program does not simulate liquid water transfer). This one-dimensional finite element program calculates combined heat and mass transfer, including conduction, convection and radiation heat transfer and lumped moisture modeling by the Effective Penetration Depth Method (Kerestecioglu, A., M. Swami; 1990, "Theoretical and Computational Investigation of Simultaneous Heat and Moisture Transfer in Buildings: Effective Penetration Depth Theory." ASHRAE Winter Meeting, Atlanta, Ga.

After determining the simulation tool to use, a prototype house with slab-on-grade was selected as a residential building in the present study. The prototype house was used in two ASHRAE research projects, 852-RP[1] and 1165-RP[2,3], all of which are hereby incorporated by reference in their entirely. It is a single story "L: shaped ranch style home with an open living plan, slab-on-grade concrete floor, and 139 $m^2$ (1500 $ft^2$) of conditioned space. The garage area is 42.4 $m^2$ ((456 $ft^2$) and attic volumes are 107 $m^3$ (3769 $ft^3$) over the living zone and 56.5 $m^3$ (1996 $ft^3$) over the garage. The attic areas are modeled as separate spaces with a plywood wall separating them. The house aspect ratio is 1:1:6 with the longer axis running east to west.

[1] Gu, L., J. E. Cummings, M. V. Swami & P. W. Fairey, "Comparison of Duct System Computer Models That Could Provide Input to the Thermal Distribution Standard Method of Test (SPC152P)," Symposium of 1998 ASHRAE Winter Annual Meeting, San Francisco, 1998.
[2] Gu, L., J. E. Cummings, M. V. Swami & P. W. Fairey 2003, "System Interactions in Forced-Air Heating and Cooling Systems, Part I: Equipment Efficiency Factors," CH-03-7-1 (RP-1165), ASHRAE Transactions 109 (1)
[3] Gu, L., J. E. Cummings, M. V. Swami & P. W. Fairey 2003, "System Interactions in Forced-Air Heating and Cooling Systems, Part II: Continuous Fan Operation," KC-03-01 (RP-1165), ASHRAE Transactions 109 (2)

Envelope constructions are listed as follows:

Exterior frame wall: 12.7 mm (½") gypsum drywall on the inside, R-19 batt insulation, and 11 mm (7⁄16") masonry exterior siding with a solar absorptance of 0.75 and a far-infrared emissivity of 0.9.

Roof: 12.7 mm (½") plywood exposed to the attic and 6.4 mm (¼") shingles on the exterior with solar absorptance of 0.85 and emissivity of 0.9. The roof slope is 5:12.

Floor: 0.1 m (4") concrete with 12.7 mm (½") carpet on the interior.

Ceiling: 12.7 mm (½") gypsum drywall and R-30 insulation mixed with 10-20% desiccant.

The heating and cooling thermostat set points are 22.2° C. (72°) and 25.6° C. (78° F.), respectively.

HVAC system: Cooling: SEER 10 Air conditioner with 0.75 sensible heating ratio; Heating: Electric heater The selected desiccant material was silica gel. For the purpose of this example, it was assumed that the desiccant material was added into the fiber glass or cellulose insulation without changing the volume of the insulation, and that both individual materials were perfectly mixed. Using the above assumptions, it is possible to generate the effective material properties of the mixture based on volume rate and weight ratio. According to Table 4 in the 2005 ASHRAE Handbook of Fundamentals, the thermal conductivity and density of R-30 fiber glass blanket and batt are 0.475 (W/m.K) and 19.2 (kg/$m^3$ average), respectively. In order to use a full set of thermal properties required by the simulation program, loose fill cellulosic insulation was selected to replace the fiber glass batt. There is a difference of density between loose fill cellulosic insulation and fiber glass batt. A large density difference could cause load shifting through thermal capacity. However, since both fiber glass and cellulose insulation are light, the thermal impact of load shifting from density difference can be considered to be negligible. For example, thermal resistance of fiber glass insulation is used in most simulation programs and density and specific heat are not required, such as DOE-2 and EnergyPlus. The main reason to eliminate inputs of density and specific heat is that thermal capacity impact of insulation material on thermal performance is negligible. In addition, those simulations with fiber glass are generally assumed to hold true for cellulose insulation. Therefore the calculated and simulated results for cellulose insulation in this study can be assumed to be similar to results for fiber glass insulation. The conclusions obtained from cellulose simulations can be applied to fiber glass ceiling insulation.

Thermal Properties

The following table lists the thermal properties of cellulose insulation and silica gel:

TABLE 1

Thermal properties of cellulose insulation and silica gel

|  | Thermal conductivity W/m · K | Density kg/m 3 | Specific heat J/kg · K |
|---|---|---|---|
| Silica Gel | 0.144 | 721 | 821 |
| Cellulose | 0.046 | 65 | 712 |

The effective thermal properties of mixed ceiling insulation with silica gel may be obtained based on volume ratio.

The following formula is used to calculate the effective thermal properties:

$$P_e = P_{fiber} + P_{desi} \times ratio \quad (3)$$

where
  $P_e$=Effective properties, including thermal conductivity, density and specific heat
  P fiber=Thermal properties of cellulose insulation
  P desi=Thermal properties of desiccant
  ratio=Volume ratio After adding silica gel in the air space of the cellulose insulation, the air space is reduced. This may be equivalent to compressing the insulation slightly. Although the density of the cellulose insulation remains the same, the thermal conductivity may be increased slightly due to compression. In order to simplify the calculation, the thermal properties of the cellulose insulation are assumed to be the same as one without compression.

The effective thermal properties and percent property changes used in the present study are listed in the following table:

TABLE 2

Effective thermal properties of the silica gel insulation mixtures

|  | K | ρ | Cp | % k | % ρ | % Cp |
|---|---|---|---|---|---|---|
| 10% silica gel mixing | 0.0604 | 137.1 | 769.3224 | 31.30 | 110.92 | 8.05 |
| 20% silica gel mixing | 0.0748 | 209.2 | 787.1329 | 62.61 | 221.85 | 10.55 |

Thermal conductivity, density and specific heat are 31%, 111% and 8% increases for the 10% silica gel mixture of ceiling insulation, and 62%, 222% and 11% increases for the 20% silica gel mixture of ceiling insulation, as compared to the cellulose only insulation.

Moisture Properties

The main interest of moisture properties of the mixture in this study is moisture adsorption and desorption, which can be expressed by a sorption curve (moisture content vs. relative humidity). Although sorption curves of cellulose and silica gel are known, the sorption curve of the mixture is not known. However, the sorption curve of the mixture can be estimated from the known moisture properties of cellulose and silica gel and the effective bulk density of the mixture found in Table 2 above.

TABLE 3

Summary of annual simulation results in Miami

| Miami | | Base | Mixing ratio | | Percent difference | |
|---|---|---|---|---|---|---|
| | | | 10% | 20% | 10% | 20% |
| Living | T_aver | 25.23 | 25.19 | 25.16 | −0.16 | −0.28 |
| | RH aver | 50.93 | 53.63 | 57.90 | 5.30 | 13.69 |
| Attic | T_aver | 30.18 | 30.50 | 30.53 | 1.05 | 1.18 |
| | RH aver | 45.50 | 36.62 | 35.82 | −19.51 | −21.26 |
| Energy use (kWh) | Heating | 322.92 | 378.56 | 403.71 | 17.23 | 25.02 |
| | Cooling | 7060.06J | 6839.23 | 6483.14 | −3.13 | −8.17 |
| | Total | 7382.96 | 7217.79 | 6886.85 | −2.3 | −6.7 |
| Ceiling heat flux | Cold | 1.46 | 5.20 | 12.07 | 255.96 | 725.33 |
| | Hot | 13.16 | 9.13 | 4.61 | −30.62 | −64.99 |
| Ceiling moisture flux | dry | 0.217 | 0.0431 | 0.00167 | −80.11 | −99.23 |
| | wet | 0.274 | 0.469 | 1.030 | 71.40 | 276.41 |

Table 3 presents a summary of annual simulation results. The first two columns are item descriptions. The third column provides annual results from the base case with cellulose only ceiling insulation. The fourth and fifth columns shows annual results from the mixture ceiling insulation with silica gel mixing ratios of 10% and 20%, respectively. The last two columns provide percent differences of mixture ceiling insulation with 10% and 20% silica gel mixing ratios, compared to the base case. The negative and positive signs represent the decrease and increase, respectively, as compared to the base case.

The items listed in Table 3 above, consist of indoor temperature (T aver.) and relative humidity (RH) in living and attic zones averaged over a period of a year, heating and cooling energy use (KWh), and the total energy use as a sum of heating and cooling energy. Annual ceiling heat ($KW/m^2$) and moisture ($Kg/s.m^2$) fluxes between the living zone and the drywall ceiling surface exposed to the living zone are also listed in Table 3. The 'cold' defined in the ceiling heat flux represents the fact that the drywall ceiling surface temperature is lower than living zone air temperature and occurs during a heating season and partly in a swing season (no heating and cooling), while the 'hot' indicates that drywall ceiling surface temperature is higher than the living zone temperature and occurs during a cooling season and partly in a swing season (no heating and cooling). The 'dry' defined in the ceiling moisture flux shows that humidity ratio of drywall ceiling surface exposed to the living space is lower than the living zone air moisture level, while the 'wet' presents the fact that ceiling surface humidity is higher than the living zone condition.

Compared to the base case of cellulose insulation only, the average living area air temperatures in Miami with the silica gel-cellulose mixture insulation are slightly lower—within 0.3%. The difference may be negligible. However, the annual average living zone relative humidity levels with the silica gel-cellulose mixture insulation increase 5.3% and 13.7% for silica gel mixing ratios of 10% and 20%, respectively. The main reason is that the higher moisture content in the mixture insulation absorbed from the attic causes a higher positive ceiling moisture flux flowing into the living space, so that the indoor relative humidity level is higher, as compared to the base case Annual average attic temperatures with the mixture insulation are slightly higher than the base case within 1.2%. But, attic relative humidity levels with the mixture insulation are much lower than the base case, 20% less with 10% mixing ratio and 21% for the 20% mixing ratio.

The following Table 4 lists annual heating and cooling energy use in four locations and three types of ceiling insulations (base R30 insulation only, R30 with 10% silica gel, and R30 with 20% silica gel) through computer modeled building simulations.

TABLE 4

Annual Heating and Cooling Energy Use in Four American Cities

| Location | Heating (kWh)[4] | | | Cooling (kWh) | | | Total (Heating + Cooling) | | |
|---|---|---|---|---|---|---|---|---|---|
| | Base | 10% | 20% | Base | 10% | 20% | Base | 10% | 20% |
| Miami | 323 | 379 | 404 | 7060 | 6839 | 6483 | 7383 | 7218 | 6887 |
| Baltimore | 45306 | 47266 | 49343 | 17 | 15 | 5 | 45322 | 47281 | 49348 |
| Minneapolis | 25929 | 27473 | 29014 | 318 | 271 | 183 | 26247 | 27744 | 29197 |
| San Francisco | 14752 | 15825 | 17541 | 150 | 100 | 41 | 14902 | 15925 | 17582 |

[4]The attic temperature in cold climates is well below the freezing point of water in winter, and the sorption performance may not be valid at very low temperatures.

Simulation results, also graphically depicted in the bar chart of FIG. 2, show that annual cooling energy use decreases, especially in "cooling dominated climates," such as Miami, while annual heating energy use increases with an increase of ceiling-attic insulation mixing ratio of silica gel. It can be concluded that a desiccant included in the attic insulation will reduce the attic humidity levels, which may increase the life span of roofing materials, such as shingles and plywood.

Conclusions

A desiccant included in the attic insulation may reduce attic humidity levels, which may increase the life span of roofing materials, such as shingles and plywood.

A desiccant included in the attic insulation may increase ceiling moisture levels, which may reduce the life span of ceiling gypsum drywall. However, the amount of moisture increase may not be high enough to cause a negative effect on the drywall.

A desiccant included in the attic insulation may increase heating energy consumption, so that the ceiling mixture use may not be useful for heating dominant climates.

A desiccant included in the attic insulation may decrease cooling energy consumption, so that the ceiling mixture use is probably suitable for cooling dominant climates.

Peak load shifting is believed to be insignificant when a desiccant is added to the attic insulation. The main reason is that the added desiccant mass is not large enough to make it become a heavy mass.

A desiccant included in the wall cavities may have similar impact with a desiccant included in the attic insulation on cooling and heating energy use. Since the wall cooling load is a smaller portion of the total cooling loads, compared to roof cooling load, the impact of cooling energy use would probably be smaller. However, the wall heating load is larger. The impact on heating load would consequently be larger. Use of desiccant in wall structures is discussed below in the discussion of FIGS. 4A and 4B.

Although the cellulose ceiling insulation was used in simulations, the conclusions obtained from the cellulose insulation can be applied to the fiber glass blanket, loose fill and batt, because the difference in thermal performance between cellulose and fiber glass insulation is considered to be negligible.

Also, although the examples above discuss insulation materials placed in an attic, in alternative embodiments, the insulation with desiccant may be disposed in an exterior side wall of a building, or in both the attic and the exterior side walls.

Further, although the examples above discuss desiccant materials that are dispersed throughout the insulation material, the desiccant may be disposed in a discrete layer, either closest to the interior living space, closest to the exterior environment, or at an intermediate location between separate interior and exterior layers of porous insulation material.

Figure 3:
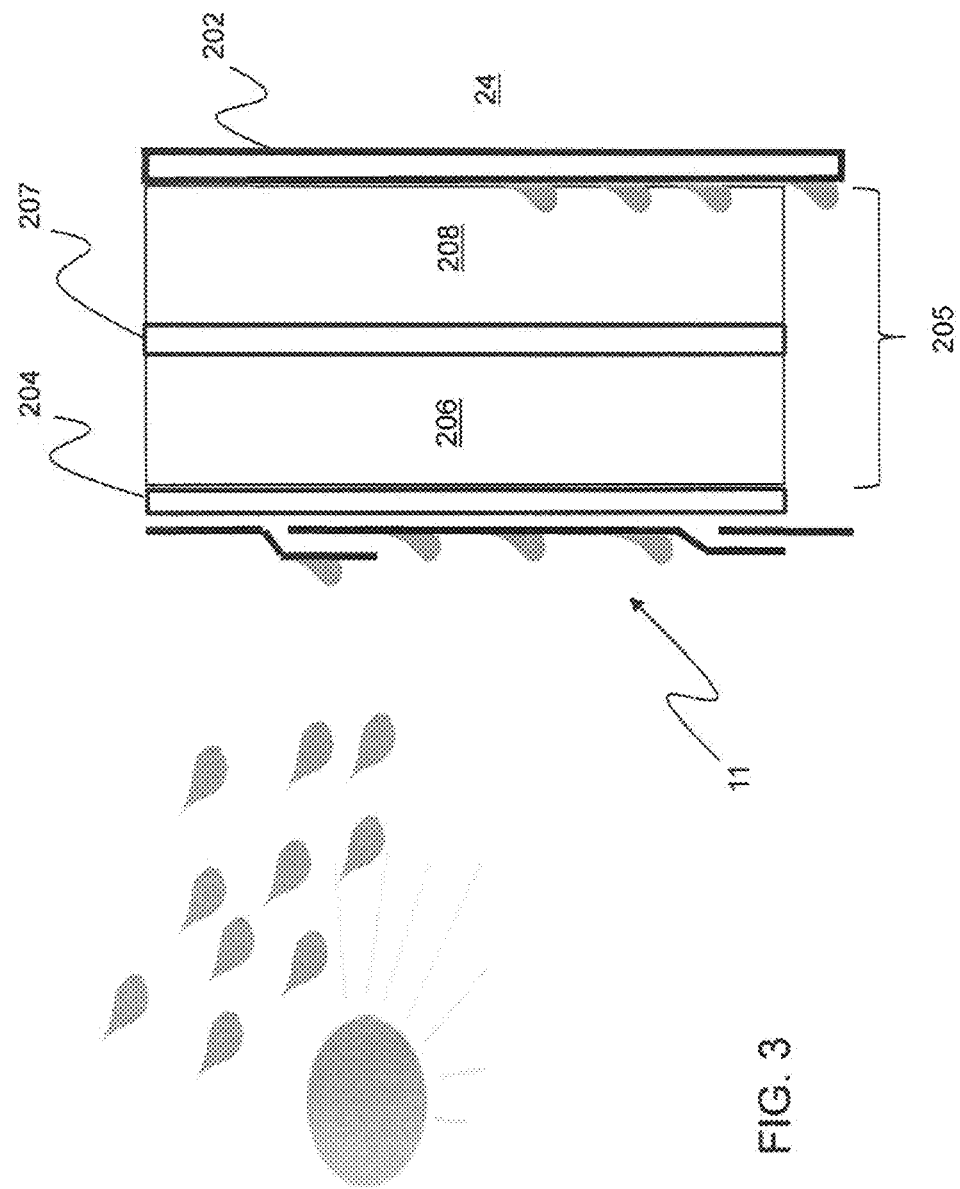
FIG. 3 is a cross-sectional view of a wall including insulation and desiccant.

FIG. 3 is a detailed diagram of one example of an exterior wall 11 suitable for use in the building 100 shown in FIG. 1. The building has an enclosed room 24 partially defined by the wall 11, a horizontal upper wall plate 12 (FIG. 1), and an attic space 25 (FIG. 2) disposed above the upper wall plate. The attic space 25 is defined by a ceiling 20 of the room 24 and a roof of the building. Referring again to FIG. 3, the wall 11 comprises an inner panel 202 and an outer panel 204 with a wall space 205 therebetween.

In some embodiments, a first layer 206 and a second layer 208 of porous insulating material are disposed so as to substantially cover the inner panel 206 in the wall space 205, with a separate layer 207 comprising a desiccant material, disposed in between the first and second layers 206, 208 of porous insulating material. In some embodiments, the insulation layers 206, 208 and desiccant material 207 substantially fill the wall space 205. In some embodiments, the first layer 206 and a second layer 208 of porous insulating material are disposed so as to substantially cover the ceiling 20 in the attic space 25. In some embodiments, both the ceiling 20 and one or more inner wall panels 208 are substantially covered with the three-layer insulation having insulation material 206 and 208 with a separate layer 207 comprising desiccant material therebetween, and the wall space 205 is substantially filled.

Subsequently, the desiccant-bearing porous layer 207 adsorbs water moisture from the attic space 25 or wall space 205, and the adsorbed water moisture desorbs from the desiccant-bearing porous layer 207 into the enclosed room 24. As a result, the temperature of the desiccant-bearing porous layer 207 is reduced, resulting in a reduction in the amount of cooling energy required to cool the building.

The desiccant bearing porous layer 207 may include a thin felt or non-woven mat impregnated with desiccant and installed on the top, bottom, or middle thickness of attic blanket, loose fill, or spray foam insulation. In some embodiments, the felt layer comprises a surface modified carbon in a polypropylene paper. In some embodiments, the felt layer comprises a surface modified carbon in polypropylene paper having 40%-60% surface modified carbon and 40%-60% binder, sold by NanoPore, Inc. of Albuquerque, N. Mex. The desiccant layer may also be Multisorb Drikette desiccant in paper sold by Multisorb Technologies, Inc. of Buffalo, N.Y.

Alternatively, the desiccant layer 207 may be positioned abutting an inner 208, outer 208 or intermediate (not shown) thickness of wall insulation, which may include one or more of batts, loose and/or open cell foam insulation. As an alternative to a desiccant impregnated felt layer, desiccant may be provided in the center of a mineral fiber batt. Desiccant may also be dispersed throughout the entire thickness of a pre-formed batt that is installed in wall cavity 205. Alternatively, desiccant may be dispersed throughout a loose fill insulation that is blown in wall cavity 205 alone or combined with open cell spray foam in wall cavity 205.

In some embodiments, a thin felt or non-woven mat 207 impregnated with desiccant or a thin desiccant impregnated batt may be adhered between two fibrous or open cell foam insulation layers 206, 208 to form a three-layered batt in the manufacturing facility. Subsequently, the three-layered batt is installed as a single unitary batt in a wall space at installation time in a single iteration of a batt installation procedure. Alternatively, an installer can install a first insulation layer, a thin felt or non-woven mat impregnated with desiccant, and a second insulation layer in a wall space during construction or renovation of an exterior wall of a building.

For a layered desiccant form application, the desiccant, in the form of a thin felt impregnated with desiccant, may be installed in the wall cavity between two layers of mineral fiber batts or on the interior or exterior surface of the mineral fiber batts or sprayed foam in a wall cavity.

For a layered desiccant form application, the desiccant, in the form of a thin felt impregnated with desiccant, may be laminated to the top and/or bottom surfaces of a mineral fiber batts. The desiccant impregnated felt may also be inserted and laminated in a fiber glass manufacturing process between two layers of fiber glass batt insulation.

For a layered desiccant form application, the desiccant may also fed/sprinkled in powdered form to the top layer of a fiber glass insulation batt or blanket and held in place with a sprayed adhesive such as a hot melt spray adhesive that is sprayed on the on the top surface of the blanket before or after the desiccant has been applied to the surface of the insulation. In an alternate embodiment, another layer of fiber glass insulation may be placed on top and laminated to the blanket with a layer of desiccant. In this manner, the desiccant is captured between two layers of mineral fiber insulation.

Examples of desiccants that may be used include white beaded and powder silica gel sold by Poly Lam Products, Williamsville, N.Y., and Syloid® and Sylox® powders and Ludox® Colloidal Silica dispersions made by GRACE Davison Chemical (W. R. Grace & Co.-Conn.), Columbia, Md.; surface modified carbon based desiccant, particle size between 50 and 500 microns, sold by NanoPore, Inc. of Albuquerque, N. Mex.; NatraSorb S silica gel sold by Multisorb Technologies, Inc. of Buffalo, N.Y.; and Multisorb NatraSorb M Montmorillonite clay.

Figure 4A:
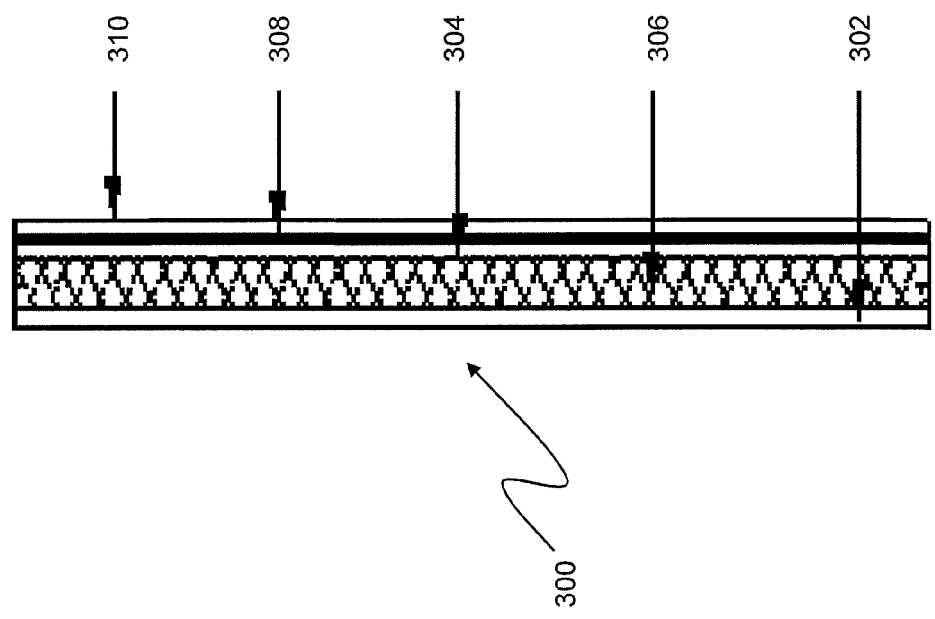
FIG. 4A is a cross sectional view of a test wall configuration.

FIG. 4A is a cross-sectional view of a test wall configuration that was used for testing heating and cooling loading, to compare a control insulation material without desiccant to two different experimental walls: (1) a wall having desiccant dispersed throughout loose fill insulation material and (2) a wall having a desiccant layer in between two layers of batt insulation. The test wall 300 included an interior dry wall panel 302 of 0.5 inch gypsum board; an insulation material layer 306; a 0.5 inch layer of oriented strand board (OSB) 304; two layers of building paper 308; and an exterior stucco layer 310.

Figure 4B:
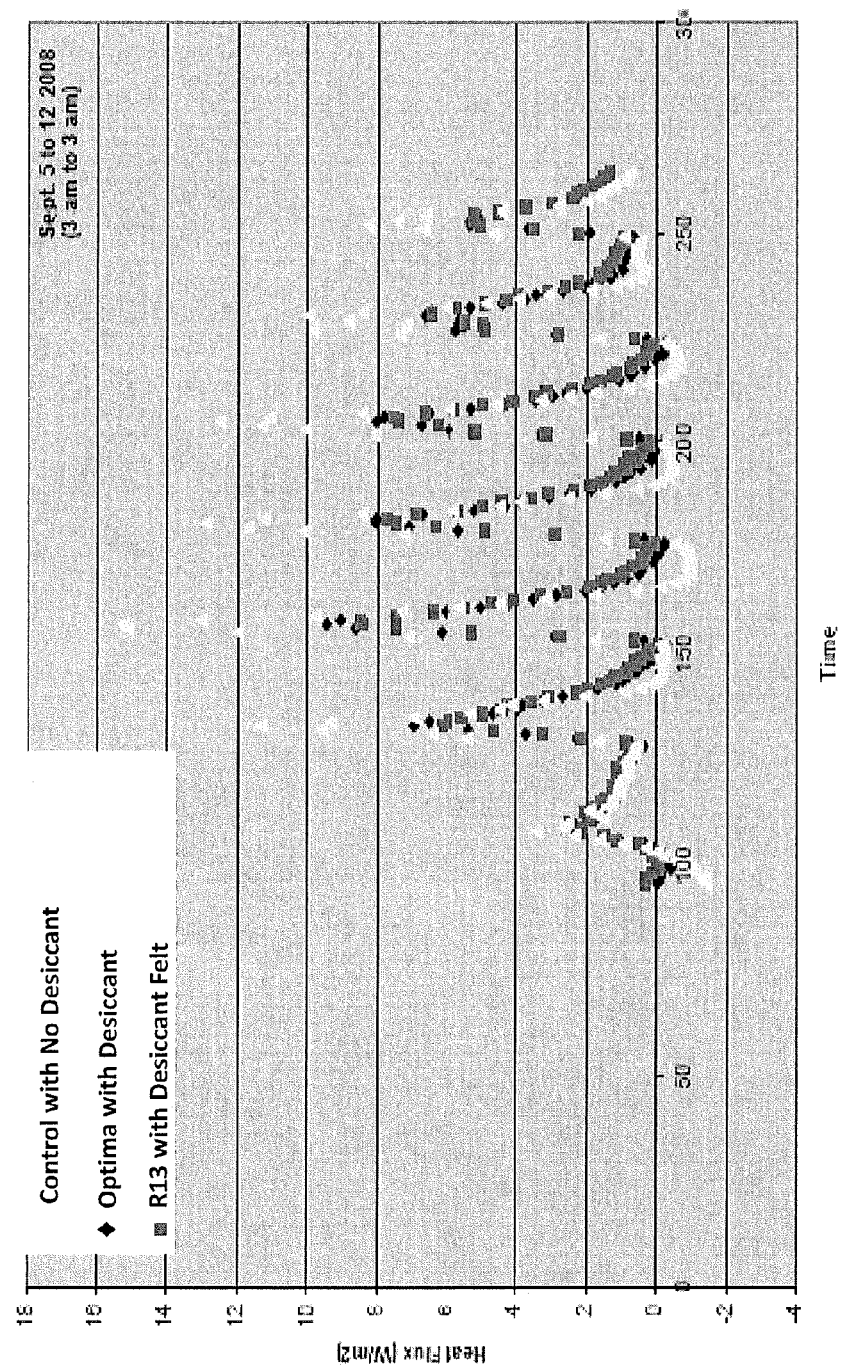
FIG. 4B is a graph comparing fiber glass insulation without desiccant to fiber glass having a distributed desiccant and fiber glass having a discrete desiccant containing layer, for the test wall shown in FIG. 4A.
Figure 4C:
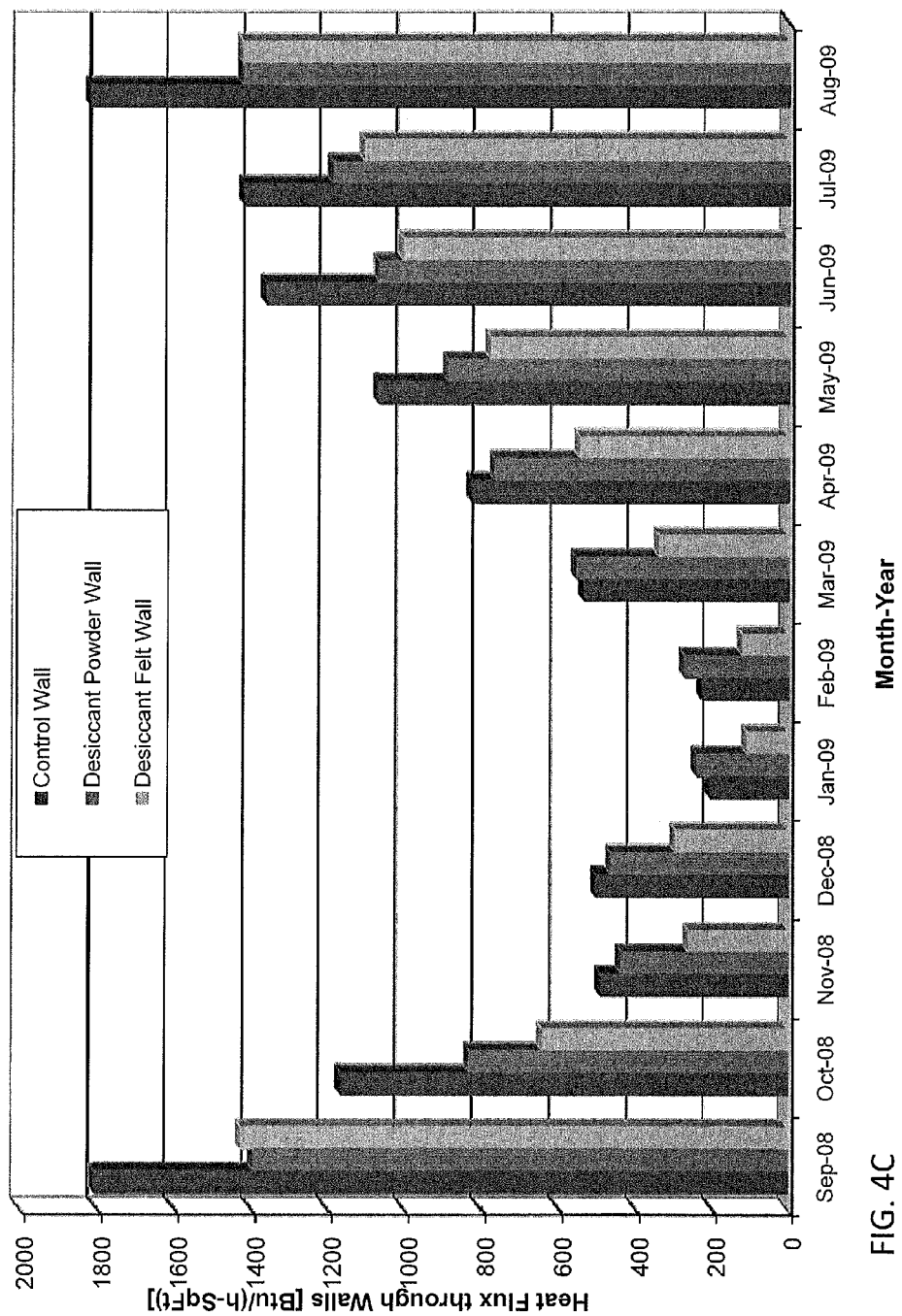
FIG. 4C is a histogram of monthly cooling loads measured during a one year test.
Figure 4D:
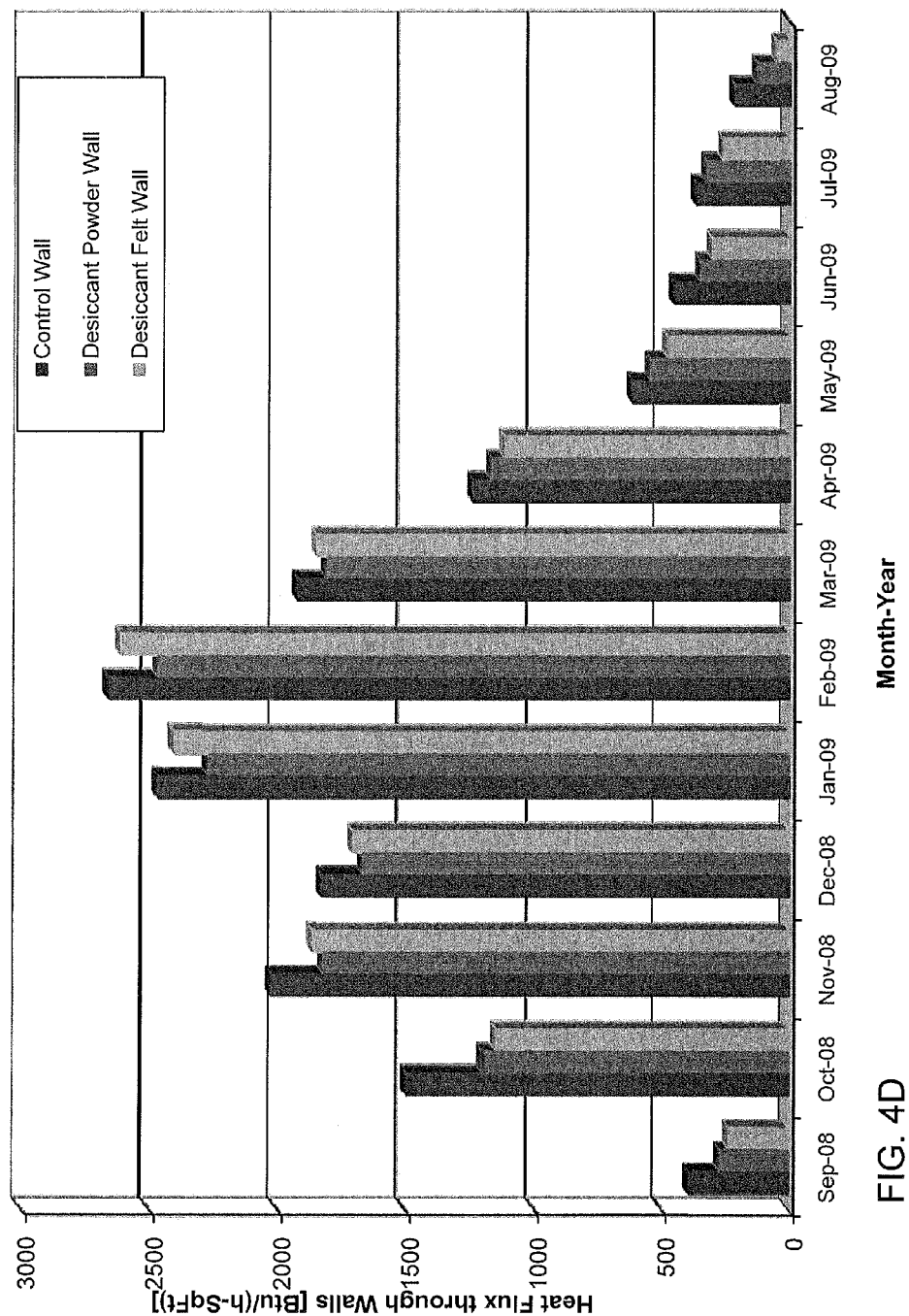
FIG. 4D is a histogram of the monthly heating loads measured during the same one year test from which the data in FIG. 4C were measured.

FIG. 4B is a graph showing experimental data collected over a period of seven days comparing cooling energy usage for three different test walls 300 with an interior room at 70° F. (21° C.), 50% relative humidity. The walls 300 were configured similarly to each other (stucco exterior with 2"×4" wood stud, and drywall interior), except for the type of insulation 306 in the interior cavity of each wall. The triangles represent hourly heat flux for a control sample (R13 fiber glass batt) in which the insulation 306 was without a desiccant. The diamonds represent hourly heat flux during the same period where the insulation 306 in the wall cavity filled was "OPTIMA®" loose fill fiber glass insulation, sold by CertainTeed Corporation of Valley Forge, Pa., mixed with a dispersed desiccant powder. The heat flux of the walls with OPTIMA and dispersed desiccant containing insulation is substantially lower, (about 40% lower) than the heat flux of the control wall. The squares represent the heat flux during the same period for a wall where the insulation 306 in the cavity was an R13 batt having a desiccant impregnated felt at its center. The "OPTIMA®" loose fill insulation comprised 10% by weight of the desiccant powder, and the R13 batt used a 28 gram/ft$^2$ desiccant impregnated felt which comprised 20% by weight of the combination of fiber glass plus desiccant felt. The heat flux is substantially lower, (about 45% lower) than the heat flux of the control wall, and about 5% lower than the wall with "OPTIMA®" loose fill fiber glass insulation. Thus, the experiment showed reduced heat flux (which should result in reduced cooling expense) with a discrete desiccant impregnated felt layer, relative to the control wall and the wall with uniformly dispersed desiccant.

Table 5 provides experimental data for three test walls collected over a twelve-month period, from which the data in FIG. 4 were taken. Both the loose fill insulation and the R13 batt with the desiccant impregnated felt at its center had similar reductions in annual heating flux of 11% when compared to the control configuration. However, there was a substantial difference between the reduction in cooling flux for the loose fill insulation (17%) versus the reduction in cooling flux for the batt with desiccant impregnated felt at its center (29%), both compared to the control configuration. In other words, the two configurations with desiccant used about the same amount of heating in the cooler months, but R13 batt with the desiccant impregnated felt at its center provided a substantially reduced cooling load in the hotter months. FIG. 4C shows the monthly cooling loads for the data of Table 5. FIG. 4D shows the monthly heating data for the data of Table 5.

TABLE 5

| Month | Cooling Heat Flux [Btu/(h · ft²)] | | | Heating Heat Flux [Btu/(h · ft²)] | | |
|---|---|---|---|---|---|---|
| | Control Wall | Desiccant Powder Wall | Desiccant Felt Wall | Control Wall | Desiccant Powder Wall | Desiccant Felt Wall |
| September 2008 | 1805.6 | 1393.6 | 1426.4 | 394.5 | 270.5 | 235.0 |
| October 2008 | 1165.8 | 828.1 | 644.0 | 1495.9 | 1197.0 | 1150.0 |
| November 2008 | 491.7 | 436.9 | 263.0 | 2024.6 | 1821.0 | 1864.0 |
| December 2008 | 504.7 | 465.4 | 297.0 | 1828.9 | 1666.3 | 1706.9 |
| January 2009 | 205.8 | 241.3 | 109.4 | 2469.2 | 2274.6 | 2407.3 |
| February 2009 | 228.4 | 273.7 | 122.1 | 2662.3 | 2467.9 | 2614.7 |
| March 2009 | 536.5 | 556.1 | 341.1 | 1925.4 | 1811.6 | 1847.8 |
| April 2009 | 824.7 | 770.4 | 546.7 | 1237.4 | 1171.8 | 1119.6 |
| May 2009 | 1069.7 | 886.3 | 781.2 | 618.9 | 547.1 | 479.7 |
| June 2009 | 1364.2 | 1067.4 | 1004.5 | 457.0 | 351.2 | 303.9 |
| July 2009 | 1422.5 | 1189.8 | 1106.5 | 368.9 | 327.0 | 261.5 |
| August 2009 | 1821.3 | 1425.2 | 1426.9 | 218.9 | 129.6 | 54.8 |
| Total | 11440.7 | 9534.3 | 8069.0 | 15701.9 | 14035.6 | 14045.3 |
| % Difference Based on Control Wall | — | −17% | −29% | — | −11% | −11% |

The embodiments described above can reduce building energy consumption through the addition of desiccant to mineral fiber, cellulose insulation or open celled foam in the walls and/or attics of a building. In predominantly-cooling climates in the summer cooling season, heat energy flowing from the building exterior to the interior is used to evaporate moisture absorbed in the desiccant rather than the heat flowing into the living space. In the heating season, heat energy flowing from the interior of the building is used to evaporate moisture absorbed in the desiccant rather than flowing to the building exterior.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A method of reducing the amount of cooling energy required to cool a building interior, said building having an enclosed room being cooled, said room being partially defined by an outer wall, an upper wall plate, and an attic space disposed above said upper wall plate and further disposed between a ceiling of said room and a roof of said building; said method comprising:
   a) disposing a porous insulating material substantially covering a floor in said attic space, said porous insulating material including at least 1 wt-% desiccant, wherein the porous insulating material includes a first layer and a second layer, and the desiccant is disposed in a separate layer between the first layer and the second layer to form a unitary batt;
   b) adsorbing water moisture and releasing heat from the attic space with the desiccant-bearing porous insulating material; and
   c) absorbing heat and desorbing the adsorbed water moisture from said desiccant-bearing porous insulation material through said ceiling and into said room being cooled, while the relative humidity in said attic space is higher than the relative humidity in said room being cooled, resulting in a reduction in the amount of heat flux entering said room and reducing the cooling energy required to cool said building interior; wherein the building is located in a cooling dominated climate;
the building is air conditioned;
the attic space has a relative humidity that is during the daylight hours of the day higher than the relative humidity of the room;
the building experiences an exterior temperature greater than 72° F.; and
whereby the heat flux entering said room is reduced by about 17% to about 29% compared to a control having a same construction as the porous insulating material but without the desiccant.

2. The method of claim 1 wherein said desiccant comprises surface modified carbon or sodium polyacrylate.

3. The method of claim 1 wherein step (c) comprises desorbing said adsorbed water moisture from said desiccant via convective mass transfer.

4. The method of claim 1 wherein said desiccant comprises a silica gel.

5. The method of claim 4 wherein said silica gel is disposed within an aqueous slurry precursor of said desiccant when added to the insulation.

6. The method of claim 4 wherein said silica gel is disposed as a dry powder.

7. The method of claim 1 wherein said building comprises spaced-apart attic floor joists disposed above said upper wall plate, and spaced-apart roof rafters disposed below and supporting said roof of said building.

8. The method of claim 7 wherein said desiccant-bearing porous insulating material is disposed at least between said attic floor joists.

9. The method of claim 1 wherein step (b) reduces a relative humidity level in said attic space.

10. The method of claim 1, wherein said porous insulating material includes 5 wt-% to 20 wt-% desiccant.

11. The method of claim 10, wherein the desiccant is silica gel and the porous insulating material is cellulose insulation, mineral fiber or fiber glass insulation.

12. The method of claim 1, wherein the separate layer is a desiccant impregnated felt layer.

13. The method of claim 12, wherein the felt layer comprises a surface modified carbon in a polypropylene paper, sodium polyacrylate, or silica gel impregnated in a felt or nonwoven material.

14. The method of claim 1 wherein the desiccant comprises montmorillonite clay, synthetic zeolite (molecular sieve), calcium oxide (CaO), calcium sulfate (CaSO4), carbon molecular sieve, or activated alumina as a layer of dry powder.

15. A method of reducing the amount of cooling energy required to cool a building, the building having an enclosed room partially defined by a wall, a horizontal upper wall plate, and an attic space disposed above the upper wall plate, the attic space defined by a ceiling of the room and a roof of the building, the wall comprising an inner panel and an outer panel with a wall space therebetween, the method comprising:
   a) disposing a first layer and a second layer of porous insulating material so as to substantially fill the wall space with a separate layer comprising a desiccant material disposed in between the first and second layers of porous insulating material that is installed as a unitary batt;
   b) adsorbing water moisture and releasing heat energy with the desiccant material from the wall space; and
   c) desorbing and evaporating water moisture and absorbing heat with the desiccant material into the enclosed room, resulting in a reduction in the amount of heat flow from an exterior of the building through the wall space and into the building; wherein
   the building is located in a cooling dominated climate;
   the building is air conditioned;
   the building experiences an exterior temperature greater than 72° F.; and
   whereby the heat flux entering said room is reduced by about 17% to about 29% compared to a control having a same construction as the porous insulating material but without the desiccant material.

16. The method of claim 15, wherein the separate layer is a desiccant impregnated felt layer.

17. The method of claim 16, wherein the felt layer comprises a surface modified carbon in a polypropylene paper.

18. The method of claim 15, wherein the first and second layers and the separate layer containing the desiccant are disposed in the inner panel in the wall space, and step (c) results in a reduction in the amount of energy used to heat the building.

19. The method of claim 18, wherein the separate layer is a desiccant impregnated felt layer.

20. The method of claim 19, wherein the felt layer comprises a surface modified carbon in a polypropylene paper, sodium polyacrylate, or silica gel impregnated in a felt or nonwoven.

21. The method of claim 15, wherein said porous insulating material includes 5 wt-% to 20 wt-% desiccant.

22. The method of claim 15, wherein said porous insulating material includes 1 wt-% to 20 wt-% desiccant material.

23. The method of claim 15, wherein the desiccant material comprises sodium polyacrylate, montmorillonite clay, synthetic zeolite (molecular sieve), calcium oxide (CaO), calcium sulfate (CaSO4), carbon molecular sieve or activated alumina as a layer of dry powder.

24. A method of reducing the amount of energy required to heat a building, the building having an enclosed room partially defined by an outer wall, a horizontal upper wall plate, and an attic space disposed above the upper wall plate, the attic space defined by a ceiling of the room and a roof of the building, the method comprising:
   a) disposing a porous, loose fill insulating material in a wall space, the porous, loose fill insulating material includes a first layer and a second layer, and the desiccant is disposed in a separate layer between the first layer and the second layer, wherein the porous, loose fill insulating material includes 1 wt % to 20 wt % desiccant;
   b) adsorbing water and releasing heat with the desiccant-bearing porous, loose fill insulating material from the wall space; and
   c) desorbing the adsorbed water moisture and desorbing heat from the desiccant-bearing porous, loose fill insulating material by desorbing the water moisture through the wall so that heat flow from an interior of the building through the wall space to an exterior of the building is reduced; wherein
   the building is heated;
   the building experiences an exterior temperature less than 72° F.; and
   whereby the heating heat flux leaving the room is reduced by up to about 11% compared to a control having a same construction as the porous, loose fill insulating material but without the desiccant.

25. The method of claim 24, wherein said porous, loose fill insulating material includes 5 wt-% to 20 wt-% desiccant material.

26. The method of claim 24, wherein the desiccant comprises montmorillonite clay, synthetic zeolite (molecular sieve), calcium oxide (CaO), calcium sulfate (CaSO4), carbon molecular sieve or activated alumina.

27. A method of reducing the energy required to heat or cool a building interior, the building having an enclosed room partially defined by an outer panel, an inner panel, a wall space between the outer and inner panels, an upper wall plate, and an attic space above the upper wall plate and between a ceiling of the enclosed room and a roof of the building, the method comprising:
   a) disposing a porous insulating material in at least one of the attic space and the wall space, the porous insulating material including a desiccant, wherein the porous insulating material includes a first layer and a second layer, and the desiccant is disposed in a separate layer between the first layer and the second layer;
   b) adsorbing water moisture and releasing heat with the desiccant from said at least one of the attic space and the wall space with the desiccant; and
   c) absorbing heat and desorbing the adsorbed water moisture from the desiccant in said at least one of the attic space and the wall space and into the enclosed room, while the relative humidity in said at least on of the attic space and wall space is higher than the relative humidity in the enclosed room, resulting in a reduction in the amount of heat flux entering the enclosed room and reducing the energy required to heat or cool the building interior.

28. A method of reducing the energy required to heat or cool a building, the building having an enclosed room partially defined by a wall, a horizontal upper wall plate, and an attic space disposed above the upper wall plate, the attic space defined by a ceiling of the room and a roof of the building, the wall having an inner panel and an outer panel with a wall space therebetween, the method comprising:
   a) disposing a first layer and a second layer of porous insulating material in at least one of the attic space and the wall space with a separate layer comprising a desiccant disposed between the first and second layers of porous insulating material;

b) adsorbing water moisture and releasing heat energy with the desiccant from said at least one of the attic space and the wall space; and c) desorbing and evaporating water moisture and absorbing heat with the desiccant into the enclosed room, resulting in a reduction in the energy required to heat or cool the building.

29. A method of reducing the energy required to heat or cool an interior of a building interior, the building having an enclosed room, with the room partially defined by an outer panel, an inner panel and a wall space between the inner and outer panel, a horizontal upper wall plate, and an attic space disposed above the upper wall plate, the attic space defined by a ceiling of the room and a roof of the building, the method comprising:

a) disposing a porous loose fill insulating material in at least one of the attic space and the wall space, installing a desiccant layer on a surface of the porous loose fill insulation, installing additional porous loose fill insulation on top of the desiccant layer;

b) adsorbing water moisture and releasing heat energy with from the desiccant layer in said at least one of the attic space and the wall space; and c) desorbing and evaporating water moisture and absorbing heat from the desiccant layer into the enclosed room, resulting in a reduction in the energy required to heat or cool the building.

* * * * *

UNITED STATES PATENT AND TRADEMARK OFFICE
CERTIFICATE OF CORRECTION

| | | |
|---|---|---|
| PATENT NO. | : 8,820,028 B2 | Page 1 of 1 |
| APPLICATION NO. | : 12/603937 | |
| DATED | : September 2, 2014 | |
| INVENTOR(S) | : Murray S. Toas et al. | |

It is certified that error appears in the above-identified patent and that said Letters Patent is hereby corrected as shown below:

In the Claims:

Column 18, claim 27, line 53, please delete "at least on of the attic", and insert --at least one of the attic--

Signed and Sealed this
Nineteenth Day of May, 2015

Michelle K. Lee
*Director of the United States Patent and Trademark Office*